(12) United States Patent
Andresen et al.

(10) Patent No.: US 10,323,502 B2
(45) Date of Patent: Jun. 18, 2019

(54) SYSTEM AND CONSOLE FOR MONITORING AND MANAGING TRIPPING OPERATIONS AT A WELL SITE

(71) Applicant: Kongsberg Oil and Gas Technologies AS, Asker (NO)

(72) Inventors: Per Arild Andresen, Kristiansand (NO); Mark Adrian Honey, Milltimber (GB); Rune Arnt Skarbo, Amstelveen (NO); Stephen Tean Edwards, Hockley, TX (US); Nigel Charles Last, Weybridge (GB); Colin James Mason, Sunbury-on-Thames (GB); Trond Waage, Kristiansand (NO); Thomas Hestenes Jakobsen, Homborsund (NO); Jan Kare Igland, Lindesnes (NO); Kevin Perry Richardson, Spring, TX (US); Sigurd Tjostheim, Kristiansand (NO)

( * ) Notice: Subject to any disclaimer, the term of this patent is extended or adjusted under 35 U.S.C. 154(b) by 461 days.

(21) Appl. No.: 14/703,788

(22) Filed: May 4, 2015

(65) Prior Publication Data
US 2016/0053605 A1 Feb. 25, 2016

Related U.S. Application Data

(60) Provisional application No. 61/987,832, filed on May 2, 2014.

(51) Int. Cl.
*E21B 45/00* (2006.01)
*E21B 47/00* (2012.01)
(Continued)

(52) U.S. Cl.
CPC .............. *E21B 47/00* (2013.01); *E21B 19/00* (2013.01); *E21B 44/00* (2013.01); *G05B 15/02* (2013.01)

(58) Field of Classification Search
CPC ........... E21B 44/00; E21B 47/00; E21B 45/00
See application file for complete search history.

(56) References Cited

U.S. PATENT DOCUMENTS 3,517,553 A 6/1970 Williams et al.
4,535,851 A 8/1985 Kirkpatrick et al.
(Continued)

FOREIGN PATENT DOCUMENTS

GB 2460556 A 12/2009
WO WO200060780 A1 10/2000
(Continued)

OTHER PUBLICATIONS

PCT International Search Report and Written Opinion, PCT/US14/020293, Kongsberg Oll and Gas AS, filed Mar. 4, 2014.
(Continued)

*Primary Examiner* — Jaehwan Oh
(74) *Attorney, Agent, or Firm* — Wayne Edward Ramage; Baker Donelson

(57) ABSTRACT

A well advisor system and console for monitoring and managing tubular tripping operations at a well site. The system may be accessed through one or more workstations, or other computing devices, which may be located at a well site or remotely. The system is in communication with and receives input from various sensors. It collects real-time sensor data sampled during operations at the well site. The system processes the data, and provides nearly instantaneous numerical and visual feedback through a variety of graphical user interfaces ("GUIs"), which are presented in the form of an operation-specific console. The input and data provides information related to tubular tripping operations at a well site.

15 Claims, 20 Drawing Sheets

(51) Int. Cl.
*E21B 44/00* (2006.01)
*E21B 19/00* (2006.01)
*G05B 15/02* (2006.01)

(56) References Cited

U.S. PATENT DOCUMENTS

| | | | |
|---|---|---|---|
| 4,571,993 | A | 2/1986 | St. Onge |
| 4,675,147 | A | 6/1987 | Schaefer et al. |
| 5,589,825 | A | 12/1996 | Pomerleau |
| 5,624,182 | A | 4/1997 | Dearing, Sr. et al. |
| 6,152,246 | A | 11/2000 | King et al. |
| 6,233,498 | B1 | 5/2001 | King et al. |
| 6,282,452 | B1 | 8/2001 | DeGuzman et al. |
| 6,484,816 | B1 | 11/2002 | Koederitz |
| 6,662,110 | B1 | 12/2003 | Bargach et al. |
| 6,668,943 | B1 | 12/2003 | Maus et al. |
| 7,003,439 | B2 * | 2/2006 | Aldred ............... E21B 44/00 175/45 |
| 7,706,980 | B2 | 4/2010 | Winters et al. |
| 8,121,971 | B2 | 2/2012 | Edwards et al. |
| 9,207,143 | B2 | 12/2015 | Franklin et al. |
| 9,238,942 | B2 * | 1/2016 | Moos ............... E21B 7/06 |
| 2002/0103630 | A1 * | 8/2002 | Aldred ............... E21B 44/00 703/10 |
| 2003/0220742 | A1 | 11/2003 | Niedermayr et al. |
| 2004/0124009 | A1 | 7/2004 | Hoteit |
| 2005/0279532 | A1 | 12/2005 | Ballantyne et al. |
| 2007/0056746 | A1 | 3/2007 | Newman |
| 2007/0151762 | A1 | 7/2007 | Reitsma |
| 2008/0105424 | A1 | 5/2008 | Remmert et al. |
| 2008/0173480 | A1 | 7/2008 | Annaiyappa et al. |
| 2008/0185143 | A1 | 8/2008 | Winters et al. |
| 2009/0090555 | A1 | 4/2009 | Boone et al. |
| 2009/0132458 | A1 | 5/2009 | Edwards et al. |
| 2009/0136326 | A1 * | 5/2009 | Angman ............... E21B 19/155 414/22.54 |
| 2010/0038088 | A1 * | 2/2010 | Springett ............... E21B 15/003 166/313 |
| 2011/0025525 | A1 | 2/2011 | Akimov et al. |
| 2011/0192598 | A1 | 8/2011 | Roddy et al. |
| 2012/0123822 | A1 | 5/2012 | Hnatio |
| 2012/0197527 | A1 | 8/2012 | McKay et al. |
| 2012/0205103 | A1 | 8/2012 | Ravi et al. |
| 2012/0217008 | A1 * | 8/2012 | Moos ............... E21B 7/06 166/250.01 |
| 2012/0272174 | A1 | 10/2012 | Vogel et al. |
| 2012/0274664 | A1 | 11/2012 | Fagnou |
| 2013/0112416 | A1 | 5/2013 | Clemens et al. |
| 2013/0135114 | A1 | 5/2013 | Ringer et al. |
| 2013/0144531 | A1 * | 6/2013 | Johnston ............... E21B 44/00 702/9 |
| 2013/0311093 | A1 | 11/2013 | Winters et al. |
| 2014/0116776 | A1 | 5/2014 | Marx et al. |
| 2014/0124218 | A1 * | 5/2014 | Pilgrim ............... E21B 44/02 166/380 |
| 2014/0299377 | A1 * | 10/2014 | Abbassian ............... E21B 44/00 175/40 |
| 2015/0315903 | A1 * | 11/2015 | Abbassian ............... E21B 47/06 702/6 |
| 2016/0053604 | A1 * | 2/2016 | Abbassian ............... E21B 44/00 702/6 |
| 2016/0053605 | A1 * | 2/2016 | Abbassian ............... E21B 44/00 702/6 |

FOREIGN PATENT DOCUMENTS

| | | |
|---|---|---|
| WO | WO2003100537 A1 | 12/2003 |
| WO | WO2005018308 A1 | 2/2005 |
| WO | WO2013142950 A1 | 10/2013 |

OTHER PUBLICATIONS

PCT International Search Report and Written Opinion, PCT/US14/026082, Kongsberg Oll and Gas AS, filed Mar. 13, 2014.
PCT International Search Report and Written Opinion, PCT/US14/026112, Kongsberg Oll and Gas AS, filed Mar. 13, 2014.
PCT International Search Report and Written Opinion, PCT/US14/026128, Kongsberg Oll and Gas AS, filed Mar. 13, 2014.
PCT International Search Report and Written Opinion, PCT/US14/026155, Kongsberg Oll and Gas AS, filed Mar. 13, 2014.
PCT International Search Report and Written Opinion, PCT/US14/044965, Kongsberg Oll and Gas AS, filed Jun. 30, 2014.
PCT International Search Report and Written Opinion, PCT/US14/044967, Kongsberg Oll and Gas AS, filed Jun. 30, 2014.
PCT International Search Report and Written Opinion, PCT/US15/038793, Kongsberg Oll and Gas AS, filed Jul. 1, 2015.
PCT International Search Report and Written Opinion, PCT/US15/038805, Kongsberg Oll and Gas AS, filed Jul. 1, 2015.
PCT International Search Report and Written Opinion, PCT/US15/038816, Kongsberg Oll and Gas AS, filed Jul. 1, 2015.
PCT International Search Report and Written Opinion, PCT/US15/038832, Kongsberg Oll and Gas AS, filed Jul. 1, 2015.
iCem Services, www.halliburton.com/public/cem/contents/Presentations/TECH/MM/Cem%20Service_Overview.pptx (2011).
Vighetto, et al., "Total drills extended-reach record in Tierra del Fuego," Oil & Gas Journal, vol. 97, issue 20 (May 17, 1999).

* cited by examiner

FIGURE 6

SYSTEM AND CONSOLE FOR MONITORING AND MANAGING TRIPPING OPERATIONS AT A WELL SITE

This application claims benefit of and priority to U.S. Provisional Application No. 61/987,832, filed May 2, 2014, and is entitled to benefit of that priority date. The specification, figures, appendices and complete disclosure of U.S. Provisional Application No. 61/987,832 are incorporated herein in their entireties by specific reference for all purposes.

FIELD OF INVENTION

This invention relates generally to oil and gas well drilling and production, and related operations. More particularly, this invention relates to a computer-implemented system for monitoring and managing the performance of well drilling operations such as tripping or casing running operations.

BACKGROUND OF THE INVENTION

It is well-known that the drilling of an oil or gas well, and related operations, is responsible for a significant portion of the costs related to oil and gas exploration and production. In particular, as new wells are being drilled into remote or less-accessible reservoirs, the complexity, time and expense to drill a well have substantially increased.

Accordingly, it is important that drilling operations be completed safely, accurately, and efficiently. With directional drilling techniques, and the greater depths to which wells are being drilled, many complexities are added to the drilling operation, and the cost and effort required to respond to a problem during drilling are high. This requires a high level of competence from the driller or drilling engineer at the drilling rig (or elsewhere) to safely drill the well as planned.

A "well plan" specifies a number of parameters for drilling a well, and is developed, in part, based on a geological model. A geological model of various subsurface formations is generated by a geologist from a variety of sources, including seismic studies, data from wells drilled in the area, core samples, and the like. A geological model typically includes depths to the various "tops" that define the formations (the term "top" generally refers to the top of a stratigraphic or biostratigraphic boundary of significance, a horizon, a fault, a pore pressure transition zone, change in rock type, or the like. Geological models usually include multiple tops, thereby defining the presence, geometry and composition of subsurface features.

The well plan specifies drilling parameters as the well bore advances through the various subsurface features. Parameters include, but are not limited to, mud weight, drill bit rotational speed, and weight on bit (WOB). The drilling operators rely on the well plan to anticipate tops and changes in subsurface features, account for drilling uncertainties, and adjust drilling parameters accordingly.

In many cases, the initial geological model may be inaccurate. The depth or location of a particular top may be off by a number of feet. Further, since some geological models recite distances based on the distance between two tops, an error in the absolute depth of one top can result in errors in the depths of multiple tops. Thus, a wellbore can advance into a high pressure subsurface formation before anticipated.

Such errors thus affect safety as well as cost and efficiency. It is fundamental in the art to use drilling "mud" circulating through the drill string to remove cuttings, lubricate the drill bit (and perhaps power it), and control the subsurface pressures. The drilling mud returns to the surface, where cuttings are removed, and is then recycled.

In some cases, the penetration of a high pressure formation can cause a sudden pressure increase (or "kick") in the wellbore. If not detected and controlled, a "blowout" can occur, which may result in failure of the well. Blowout preventers ("BOP") are well known in the art, and are used to protect drilling personnel and the well site from the effects of a blowout. A variety of systems and methods for BOP monitoring and testing are known in the art, including "Blowout Preventer Testing System and Method," U.S. Pat. No. 7,706,890, and "Monitoring the Health of Blowout Preventer," US 2012/0197527, both of which are incorporated herein in their entireties by specific reference for all purposes.

Conversely, if the mud weight is too heavy, or the wellbore advances into a particularly fragile or fractured formation, a "lost circulation" condition may result where drilling mud is lost into the formation rather than returning to the surface. This leads not only to the increased cost to replace the expensive drilling mud, but can also result in more serious problems, such as stuck drill pipe, damage to the formation or reservoir, and blowouts.

Similar problems and concerns arise during other well operations, such as running and cementing casing and tubulars in the wellbore, wellbore completions, or subsurface formation characterizations.

Drills strings and drilling operations equipment include a number of sensors and devices to measure, monitor and detect a variety of conditions in the wellbore, including, but not limited to, hole depth, bit depth, mud weight, choke pressure, and the like. This data can be generated in real-time, but can be enormous, and too voluminous for personnel at the drilling site to review and interpret in sufficient detail and time to affect the drilling operation. Some of the monitored data may be transmitted back to an engineer or geologist at a remote site, but the amount of data transmitted may be limited due to bandwidth limitations. Thus, not only is there a delay in processing due to transmission time, the processing and analysis of the data may be inaccurate due to missing or incomplete data. Drilling operations continue, however, even while awaiting the results of analysis (such as an updated geological model).

A real-time drilling monitor (RTDM) workstation is disclosed in "Drilling Rig Advisor Console," U.S. application Ser. No. 13/312,646, which is incorporated herein by specific reference for all purposes. The RTDM receives sensor signals from a plurality of sensors and generates single graphical user interface with dynamically generated parameters based on the sensor signals.

Likewise, an intelligent drilling advisor system is disclosed in "Intelligent Drilling Advisor," U.S. Pat. No. 8,121,971, which is incorporated herein by specific reference for all purposes. The intelligent advisor system comprises an information integration environment that accesses and configures software agents that acquire data from sensors at a drilling site, transmit that data to the information integration environment, and drive the drilling state and the drilling recommendations for drilling operations at the drilling site.

SUMMARY OF INVENTION

In various embodiments, the present invention comprises a well advisor system for monitoring and managing well drilling and production operations. The system may be accessed through one or more workstations, or other computing devices. A workstation comprises one or more computers or computing devices, and may be located at a well site or remotely. The system can be implemented on a single computer system, multiple computers, a computer server, a handheld computing device, a tablet computing device, a smart phone, or any other type of computing device.

The system is in communication with and receives input from various sensors. In general, the system collects real-time sensor data sampled during operations at the well site, which may include drilling operations, running casing or tubular goods, completion operations, or the like. The system processes the data, and provides nearly instantaneous numerical and visual feedback through a variety of graphical user interfaces ("GUIs").

The GUIs are populated with dynamically updated information, static information, and risk assessments, although they also may be populated with other types of information. The users of the system thus are able to view and understand a substantial amount of information about the status of the particular well site operation in a single view, with the ability to obtain more detailed information in a series of additional views.

In one embodiment, the system is installed at the well site, and thus reduces the need to transmit date to a remote site for processing. The well site can be an offshore drilling platform or land-based drilling rig. This reduces delays due to transmitting information to a remote site for processing, then transmitting the results of that processing back to the well site. It also reduces potential inaccuracies in the analysis due to the reduction in the data being transmitted. The system thus allows personnel at the well site to monitor the well site operation in real time, and respond to changes or uncertainties encountered during the operation. The response may include comparing the real time data to the current well plan, and modifying the well plan.

In yet another embodiment, the system is installed at a remote site, in addition to the well site. This permits users at the remote site to monitor the well-site operation in a similar manner to a user at the well-site installation.

In some exemplary embodiments, the system is a web-enabled application, and the system software may be accessed over a network connection such as the Internet. A user can access the software via the user's web browser. In some embodiments, the system performs all of the computations and processing described herein and only display data is transmitted to the remote browser or client for rendering screen displays on the remote computer. In another embodiment, the remote browser or software on the remote system performs some of the functionality described herein.

Sensors may be connected directly to the workstation at the well site, or through one or more intermediate devices, such as switches, networks, or the like. Sensors may comprise both surface sensors and downhole sensors. Surface sensors include, but are not limited to, sensors that detect torque, revolutions per minute (RPM), and weight on bit (WOB). Downhole sensors include, but are not limited to, gamma ray, pressure while drilling (PWD), and resistivity sensors. The surface and downhole sensors are sampled by the system during drilling or well site operations to provide information about a number of parameters. Surface-related parameters include, but are not limited to, the following: block position; block height; trip/running speed; bit depth; hole depth; lag depth; gas total; lithography percentage; weight on bit; hook load; choke pressure; stand pipe pressure; surface torque; surface rotary; mud motor speed; flow in; flow out; mud weight; rate of penetration; pump rate; cumulative stroke count; active mud system total; active mud system change; all trip tanks; and mud temperature (in and out). Downhole parameters include, but are not limited to, the following: all FEMWD; bit depth; hole depth; PWD annular pressure; PWD internal pressure; PWD EMW; PWD pumps off (min, max and average); drill string vibration; drilling dynamics; pump rate; pump pressure; slurry density; cumulative volume pumped; leak off test (LOT) data; and formation integrity test (FIT) data. Based on the sensed parameters, the system causes the processors or microprocessor to calculate a variety of other parameters, as described below.

In several embodiments, the system software comprises a database/server, a display or visualization module, one or more smart agents, one or more templates, and one or more "widgets." The database/server aggregates, distributes and manages real-time data being generated on the rig and received through the sensors. The display or visualization module implements a variety of GUI displays, referred to herein as "consoles," for a variety of well site operations. The information shown on a console may comprise raw data and calculated data in real time.

Templates defining a visual layout may be selected or created by a user to display information in some portions of or all of a console. In some embodiments, a template comprises an XML file. A template can be populated with a variety of information, including, but not limited to, raw sensor data, processed sensor data, calculated data values, and other information, graphs, and text. Some information may be static, while other information is dynamically updated in real time during the well site operation. In one embodiment, a template may be built by combining one or more display "widgets" which present data or other information. Smart agents perform calculations based on data generated through or by one or more sensors, and said calculated data can then be displayed by a corresponding display widgets.

In one exemplary embodiment, the system provides the user the option to implement a number of consoles corresponding to particular well site operations. In one embodiment, consoles include, but are not limited to, rig-site fluid management, BOP management, cementing, and casing running. A variety of smart agents and other programs are used by the consoles. Smart agents and other programs may be designed for use by a particular console, or may be used by multiple consoles. A particular installation of the system may comprise a single console, a sub-set of available consoles, or all available consoles.

Agents can be configured, and configuration files created or modified, using the agent properties display. The same properties are used for each agent, whether the agent configuration is created or imported. The specific configuration information (including, but not limited to, parameters, tables, inputs, and outputs) varies depending on the smart agent. Parameters represent the overall configuration of the agent, and include basic settings including, but not limited to, start and stop parameters, tracing, whether data is read to a log, and other basic agent information. Tables comprise information appearing in database tables associated with the agent. Inputs and outputs are the input or output mnemonics that are being tracked or reported on by the agent. For several embodiments, in order for data to be tracked or reported on, each output must have an associated output. This includes, but is not limited to, log and curve information.

In one embodiment, the system comprises a Tripping Console used to plan and monitor all tripping-in and tripping-out operations for casing, drill and completion strings, including BHA assemblies, both with no rotary movement, and with rotary movement (e.g., as with reaming-down and backreaming operations). It captures and displays, in real time or near real-time (e.g., within 10 to 20 seconds), at least the following information for all tripping states: hookload; block position; block velocity; flow rate; and surface pressure.

The Tripping Console comprises several widgets. A Make-Up Torque Widget monitors the make-up torque signatures as each joint of a completions string is made up prior to running into the wellbore. The torque response measured during the winding of a completion joint provides real time or near real time information about the make-up to help determine if the joint was made up within acceptable tolerances. A warning indicator and success indicator can be provided. In one embodiment, the success indicator is the assessment made by a service company or vendor, while the warning indicator is displayed if the analysis of the data raises concerns about the torque signature for that joint (e.g., the make-up torque exceeds a running average value by a pre-set percentage).

A Completions Schematic Widget provides a well tubular completion schematic as a visual schematic, with corresponding columns for MD and TVD (in meters), description of the components, maker type, minimum inner diameter, maximum outer diameter, drift, length, material elastomer information, other component information. and comments. The schematic also include well information, wellhead data, tubing data, casing data, and liner data. The user can examine a detailed display of a selected section of the tubular schematic.

An Activity Widget displays the accumulative and individual activities that occur for a particular sequence. And a Drag Chart Widget monitors tubular trips over the lifetime of a run for a given hole section (e.g., multiple trips of a given drill string or particular tubular object, such as a particular BHA). Actual and modelled hookloads are shown against measured depth (MD), for a series of trips into the well. Associated rotating data parameters (e.g., RPM, surface torque) may be displayed.

BRIEF DESCRIPTION OF THE DRAWINGS

FIG. 6 shows a smart agent configuration display screen.

FIG. 21-22 show examples of Drag Chart Widget displays.

DETAILED DESCRIPTION OF EXEMPLARY EMBODIMENTS

Computing Environment Context

Figure 1:
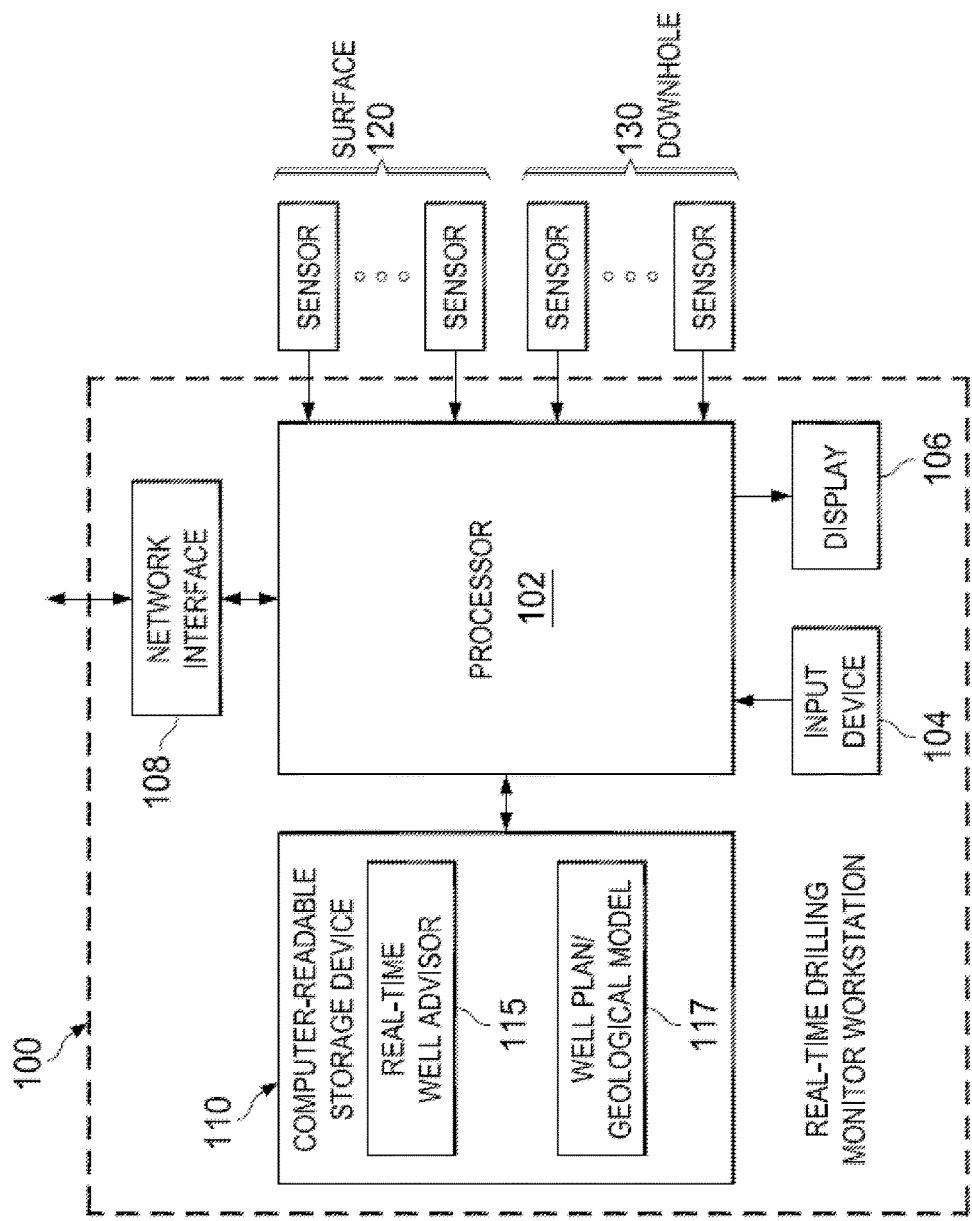
FIG. 1 shows a view of a system in accordance with an embodiment of the present invention.

The following discussion is directed to various exemplary embodiments of the present invention, particularly as implemented into a situationally-aware distributed hardware and software architecture in communication with one or more operating drilling rigs. However, it is contemplated that this invention may provide substantial benefits when implemented in systems according to other architectures, and that some or all of the benefits of this invention may be applicable in other applications. For example, while the embodiments of the invention may be described herein in connection with wells used for oil and gas exploration and production, the invention also is contemplated for use in connection with other wells, including, but not limited to, geothermal wells, disposal wells, injection wells, and many other types of wells. One skilled in the art will understand that the examples disclosed herein have broad application, and that the discussion of any particular embodiment is meant only to be exemplary of that embodiment, and not intended to suggest that the scope of the disclosure, including the claims, is limited to that embodiment.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

By way of further background, the term "software agent" refers to a computer software program or object that is capable of acting in a somewhat autonomous manner to carry out one or more tasks on behalf of another program or object in the system. Software agents can also have one or more other attributes, including mobility among computers in a network, the ability to cooperate and collaborate with other agents in the system, adaptability, and also specificity of function (e.g., interface agents). Some software agents are sufficiently autonomous as to be able to instantiate themselves when appropriate, and also to terminate themselves upon completion of their task.

The term "expert system" refers to a software system that is designed to emulate a human expert, typically in solving a particular problem or accomplishing a particular task. Conventional expert systems commonly operate by creating a "knowledge base" that formalizes some of the information known by human experts in the applicable field, and by codifying some type of formalism by way the information in the knowledge base applicable to a particular situation can be gathered and actions determined. Some conventional expert systems are also capable of adaptation, or "learning", from one situation to the next. Expert systems are commonly considered to be in the realm of "artificial intelligence."

The term "knowledge base" refers to a specialized database for the computerized collection, organization, and retrieval of knowledge, for example in connection with an expert system. The term "rules engine" refers to a software component that executes one or more rules in a runtime environment providing among other functions, the ability to: register, define, classify, and manage all the rules, verify consistency of rules definitions, define the relationships among different rules, and relate some of these rules to other software components that are affected or need to enforce one or more of the rules. Conventional approaches to the "reasoning" applied by such a rules engine in performing these functions involve the use of inference rules, by way of which logical consequences can be inferred from a set of asserted facts or axioms. These inference rules are commonly specified by means of an ontology language, and often a description language. Many reasoners use first-order predicate logic to perform reasoning; inference commonly proceeds by forward chaining and backward chaining.

The present invention may be implemented into an expert computer hardware and software system, implemented and operating on multiple levels, to derive and apply specific tools at a drilling site from a common knowledge base, including, but not limited to, information from multiple drilling sites, production fields, drilling equipment, and drilling environments. At a highest level, a knowledge base is developed from attributes and measurements of prior and current wells, information regarding the subsurface of the production fields into which prior and current wells have been or are being drilled, lithology models for the subsurface at or near the drilling site, and the like. In this highest level, an inference engine drives formulations (in the form of rules, heuristics, calibrations, or a combination thereof) based on the knowledge base and on current data. An interface to human expert drilling administrators is provided for verification of these rules and heuristics. These formulations pertain to drilling states and drilling operations, as well as recommendations for the driller, and also include a trendologist function that manages incoming data based on the quality of that data, such management including the amount of processing and filtering to be applied to such data, as well as the reliability level of the data and of calculations therefrom.

At another level, an information integration environment is provided that identifies the current drilling sites, and drilling equipment and processes at those current drilling sites. Based upon that identification, and upon data received from the drilling sites, servers access and configure software agents that are sent to a host client system at the drilling site; these software agents operate at the host client system to acquire data from sensors at the drilling site, to transmit that data to the information integration environment, and to derive the drilling state and drilling recommendations for the driller at the drilling site. These software agents include one or more rules, heuristics, or calibrations derived by the inference engine, and called by the information integration environment. In addition, the software agents sent from the information integration environment to the host client system operate to display values, trends, and reliability estimates for various drilling parameters, whether measured or calculated.

The information integration environment is also operative to receive input from the driller via the host client system, and to act as a knowledge base server to forward those inputs and other results to the knowledge base and the inference engine, with verification or input from the drilling administrators as appropriate.

According to another aspect of the invention, the system develops a knowledge base from attributes and measurements of prior and current wells, and from information regarding the subsurface of the production fields into which prior and current wells have been or are being drilled. According to this aspect of the invention, the system self-organizes and validates historic, real time, and/or near real time depth or time based measurement data, including information pertaining to drilling dynamics, earth properties, drilling processes and driller reactions. This drilling knowledge base suggests solutions to problems based on feedback provided by human experts, learns from experience, represents knowledge, instantiates automated reasoning and argumentation for embodying best drilling practices.

According to yet another aspect of the invention, the system includes the capability of virtualizing information from a well being drilled into a collection of metalayers, such metalayers corresponding to a collection of physical information about the layer (material properties, depths at a particular location, and the like) and also information on how to successfully drill through such a layer, such metalayers re-associating as additional knowledge is acquired, to manage real-time feedback values in optimizing the drilling operation, and in optimizing the driller response to dysfunction. Normalization into a continuum, using a system of such metalayers, enables real-time reaction to predicted downhole changes that are identified from sensor readings.

According to another aspect of the invention, the system is capable of carrying out these functions by creating and managing a network of software agents that interact with the drilling environment to collect and organize information for the knowledge base, and to deliver that information to the knowledge base. The software agents in this network are persistent, autonomous, goal-directed, sociable, reactive, non-prescriptive, adaptive, heuristic, distributed, mobile and self-organizing agents for directing the driller toward drilling optimization, for collecting data and information, and for creating dynamic transitional triggers for metalayer instantiation. These software entities interact with their environment through an adaptive rule-base to intelligently collect, deliver, adapt and organize information for the drilling knowledge base. According to this aspect of the invention, the software agents are created, modified and destroyed as needed based on the situation at the drilling rig, within the field, or at any feasible knowledge collection point or time instance within the control scope of any active agent.

According to another aspect of the invention, the software agents in the network of agents are controlled by the system to provide the recommendations to the drillers, using one or more rules, heuristics, and calibrations derived from the knowledge base and current sensor signals from the drilling site, and as such in a situationally aware manner. In this regard, the software agents interact among multiple software servers and hardware states in order to provide recommendations that assist human drillers in the drilling of a borehole into the earth at a safely maximized drilling rate. The software "experts" dispatch agents, initiate transport of remote memory resources, and provide transport of knowledge base components including rules, heuristics, and calibrations according to which a drilling state or drilling recommendation is identified responsive to sensed drilling conditions in combination with a selected parameter that is indicative of a metalayer of the earth, and in combination with selected minimums and maximums of the drilling equipment sensor parameters. The software experts develop rules, heuristics, and calibrations applicable to the drilling site derived from the knowledge base that are transmitted via an agent to a drilling advisor application, located at the drilling site, that is coupled to receive signals from multiple sensors at the drilling site, and also to one or more servers that configure and service multiple software agents.

According to another aspect of the invention, the system is applied to circulation actors to optimize circulation, hydraulics at the drill bit point of contact with the medium being drilled, rationalization of distributed pressure and temperature measurements and to provide recommendations to avoid or recover from loss of circulation events.

In addition, while this invention is described in connection with a multiple level hardware and software architecture system, in combination with drilling equipment and human operators, it is contemplated that several portions and facets of this invention are separately and independently inventive and beneficial, whether implemented in this overall system environment or if implemented on a stand-alone basis or in other system architectures and environments. Those skilled in the art having reference to this specification are thus directed to consider this description in such a light.

Well Advisor System and Consoles

FIG. 1 illustrates a workstation showing a well advisor system 100 in accordance with various exemplary embodiments of the present invention. The workstation comprises one or more computers or computing devices, and may be located at a well site or remotely. The system can be implemented on a single computer system, multiple computers, a computer server, a handheld computing device, a tablet computing device, a smart phone, or any other type of computing device.

The system is in communication with and receives input from various sensors 120, 130. In general, the system collects real-time sensor data sampled during operations at the well site, which may include drilling operations, running casing or tubular goods, completion operations, or the like. The system processes the data, and provides nearly instantaneous numerical and visual feedback through a variety of graphical user interfaces (GUIs).

The GUIs are populated with dynamically updated information, static information, and risk assessments, although they also may be populated with other types of information, as described below. The users of the system thus are able to view and understand a substantial amount of information about the status of the particular well site operation in a single view, with the ability to obtain more detailed information in a series of additional views.

In one embodiment, the system is installed at the well site, and thus reduces the need to transmit date to a remote site for processing. The well site can be an offshore drilling platform or land-based drilling rig. This reduces delays due to transmitting information to a remote site for processing, then transmitting the results of that processing back to the well site. It also reduces potential inaccuracies in the analysis due to the reduction in the data being transmitted. The system thus allows personnel at the well site to monitor the well site operation in real time, and respond to changes or uncertainties encountered during the operation. The response may include comparing the real time data to the current well plan, and modifying the well plan.

In yet another embodiment, the system is installed at a remote site, in addition to the well site. This permits users at the remote site to monitor the well-site operation in a similar manner to a user at the well-site installation.

The architecture of the system workstation shown in FIG. 1 is only one example of multiple possible architectures. In one embodiment, the workstation comprises one or more processors or microprocessors 102 coupled to one or more input devices 104 (e.g., mouse, keyboard, touchscreen, or the like), one or more output devices 106 (e.g., display, printer, or the like), a network interface 108, and one or more non-transitory computer-readable storage devices 110. In some embodiments, the input and output devices may be part of the workstation itself, while in other embodiment such devices may be accessible to the workstation through a network or other connection.

In one exemplary embodiment, the network interface may comprise a wire-based interface (e.g., Ethernet), or a wireless interface (e.g., BlueTooth, wireless broadband, IEEE 802.11x WiFi, or the like), which provides network connectivity to the workstation and system to enable communications across local and/or wide area networks. For example, the workstation can receive portions of or entire well or cementing plans or geological models 117 from a variety of locations.

The storage devices 110 may comprise both non-volatile storage devices (e.g., flash memory, hard disk drive, or the like) and volatile storage devices (e.g., RAM), or combinations thereof. The storage devices store the system software 115 which is executable by the processors or microprocessors to perform some or all of the functions describe below. The storage devices also may be used to store well plans, geological models 117, configuration files and other data.

In some exemplary embodiments, the system is a web-enabled application, and the system software may be accessed over a network connection such as the Internet. A user can access the software via the user's web browser. In some embodiments, the system performs all of the computations and processing described herein and only display data is transmitted to the remote browser or client for rendering screen displays on the remote computer. In other embodiments, the remote browser or software on the remote system performs some of the functionality described herein.

Sensors 120, 130 may be connected directly to the workstation at the well site, or through one or more intermediate devices, such as switches, networks, or the like. Sensors may comprise both surface sensors 120 and downhole sensors 130. Surface sensors include, but are not limited to, sensors that detect torque, revolutions per minute (RPM), and weight on bit (WOB). Downhole sensors include, but are not limited to, gamma ray, pressure while drilling (PWD), and resistivity sensors. The surface and downhole sensors are sampled by the system during drilling or well site operations to provide information about a number of parameters. Surface-related parameters include, but are not limited to, the following: block position; block height; trip/running speed; bit depth; hole depth; lag depth; gas total; lithography percentage; weight on bit; hook load; choke pressure; stand pipe pressure; surface torque; surface rotary; mud motor speed; flow in; flow out; mud weight; rate of penetration; pump rate; cumulative stroke count; active mud system total; active mud system change; all trip tanks; and mud temperature (in and out). Downhole parameters include, but are not limited to, the following: all FEMWD; bit depth; hole depth; PWD annular pressure; PWD internal pressure; PWD EMW; PWD pumps off (min, max and average); drill string vibration; drilling dynamics; pump rate; pump pressure; slurry density; cumulative volume pumped; leak off test (LOT) data; and formation integrity test (FIT) data. Based on the sensed parameters, the system causes the processors or microprocessor to calculate a variety of other parameters, as described below.

Figure 2:
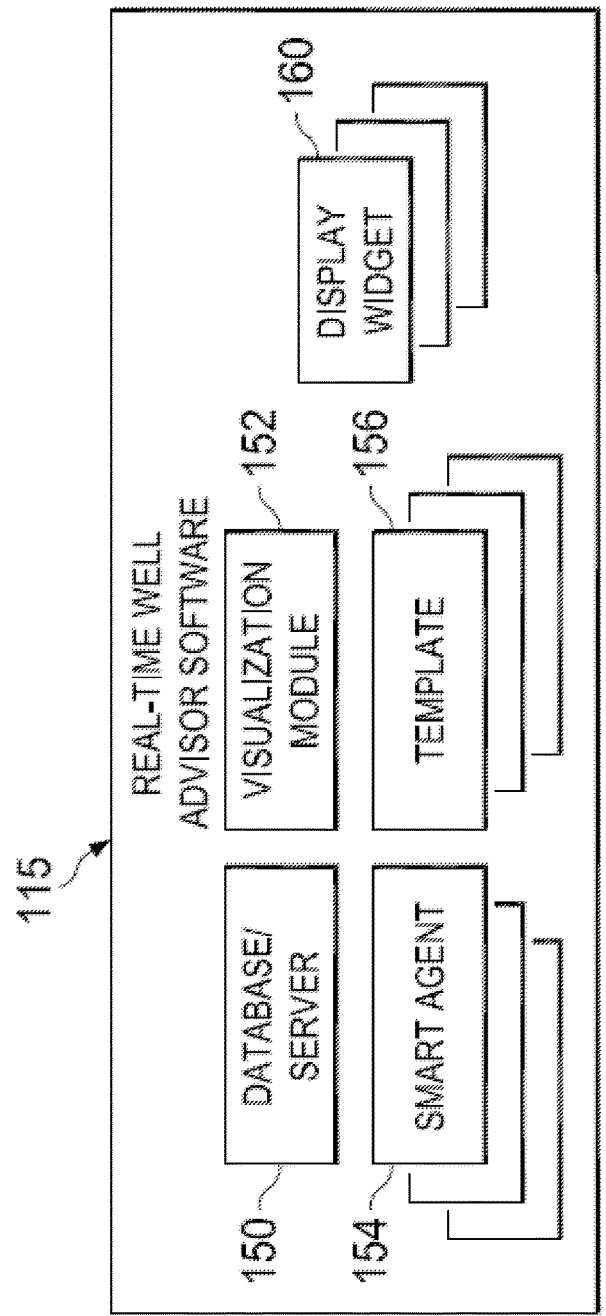
FIG. 2 shows a software architecture in accordance with various embodiments of the present invention.

FIG. 2 provides an example of the system software architecture. The system software comprises a database/server 150, a display or visualization module 152, one or more smart agents 154, one or more templates 156, and one or more "widgets" 160. The database/server 150 aggregates, distributes and manages real-time data being generated on the rig and received through the sensors. The display or visualization module 152 implements a variety of graphical user interface displays, referred to herein as "consoles," for a variety of well site operations. The information shown on a console may comprise raw data and calculated data in real time.

Templates 156 defining a visual layout may be selected or created by a user to display information in some portions of or all of a console. In some embodiments, a template comprises an XML file. A template can be populated with a variety of information, including, but not limited to, raw sensor data, processed sensor data, calculated data values, and other information, graphs, and text. Some information may be static, while other information is dynamically updated in real time during the well site operation. In one embodiment, a template may be built by combining one or more display "widgets" 160 which present data or other information. Smart agents 154 perform calculations based on data generated through or by one or more sensors, and said calculated data can then be displayed by a corresponding display widgets.

In one exemplary embodiment, the system provides the user the option to implement a number of consoles corresponding to particular well site operations. In one embodiment, consoles include, but are not limited to, rig-site fluid management, BOP management, cementing, and casing running. A variety of smart agents and other programs are used by the consoles. Smart agents and other programs may be designed for use by a particular console, or may be used by multiple consoles. A particular installation of the system may comprise a single console, a sub-set of available consoles, or all available consoles.

Figure 3:
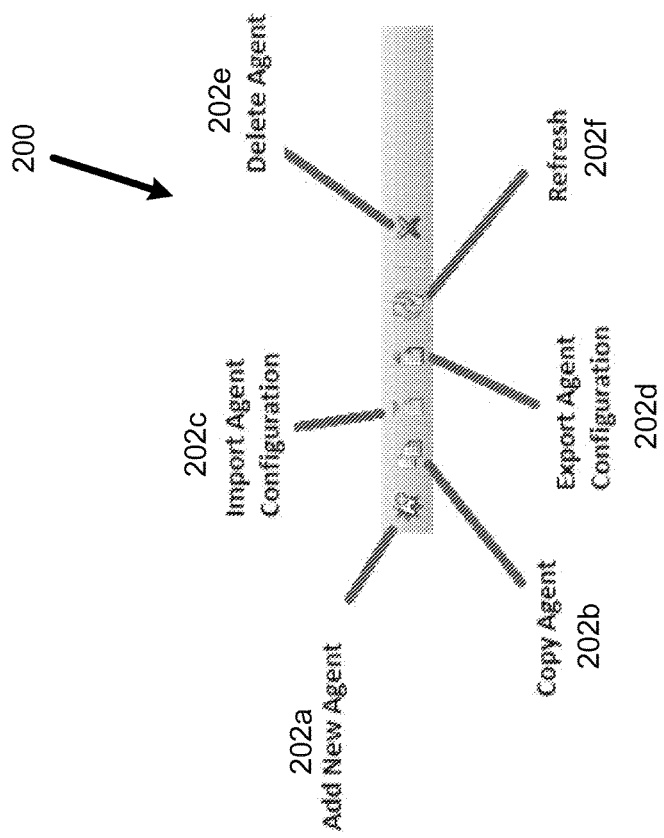
FIG. 3 shows a smart agent management toolbar.
Figure 4:
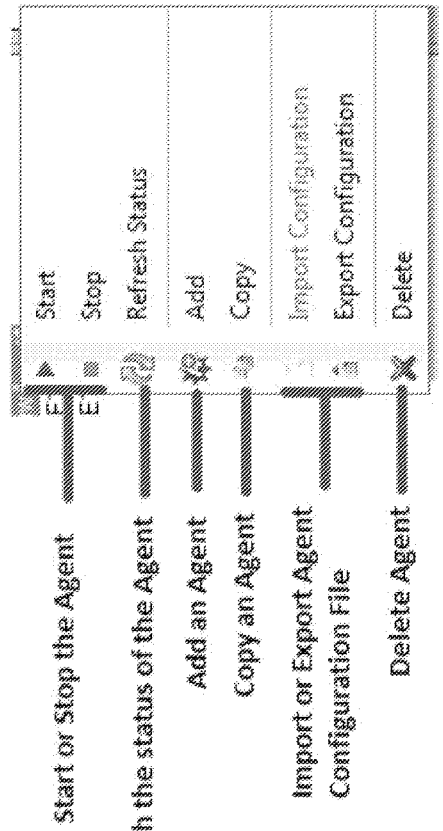
FIG. 4 shows a smart agent management menu.

In various embodiments, smart agents in the system can be managed with a toolbar 200 (as seen in FIG. 3) or by a drop-down menu 210 (as seen in FIG. 4), which may be activated by clicking on a smart agent icon, right-click on a mouse button, or the like. Functions include, but are not limited to, adding a new agent 202a, copying an agent configuration 202b, importing 202c or exporting 202d an agent configuration file, deleting an agent 202e, refreshing the status of an agent 202f, or starting or stopping an agent.

Figure 5:
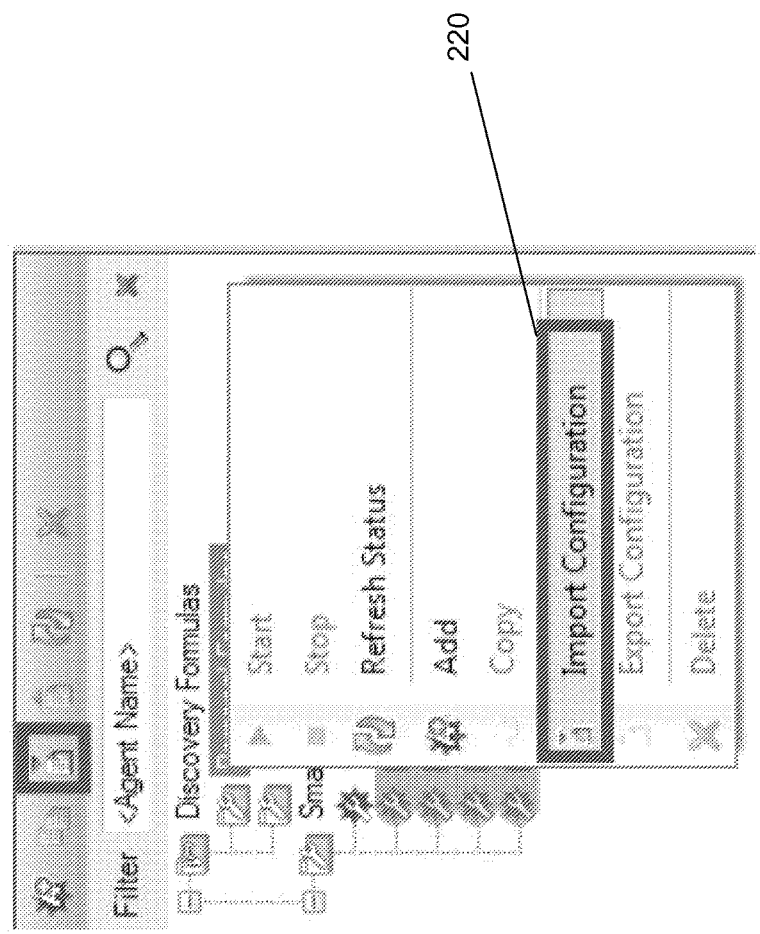
FIG. 5 shows a smart agent configuration file import menu.

For certain smart agents, an agent configuration file must be imported 220 to use the smart agent, as seen in FIG. 5. In one embodiment, configuration files are denominated as *.agent files. Selecting the import option provides the user the option to enter the configuration file name, or browse to a location where the configuration file is stored.

Figure 6:
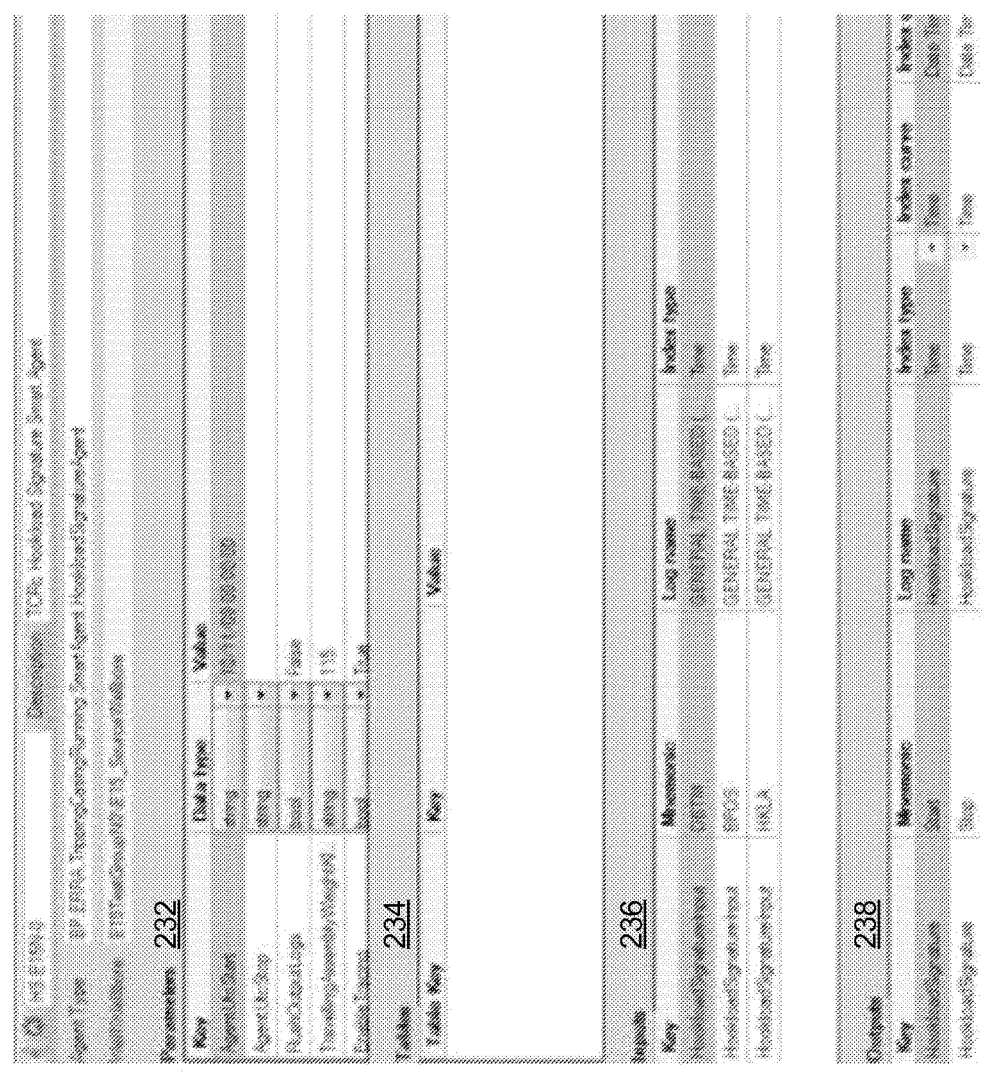

Agents can be configured, and configuration files created or modified, using the agent properties display, as seen in FIG. 6. The same properties are used for each agent, whether the agent configuration is created or imported. The specific configuration information (including, but not limited to, parameters, tables, inputs, and outputs) varies depending on the smart agent. Parameters 232 represent the overall configuration of the agent, and include basic settings including, but not limited to, start and stop parameters, tracing, whether data is read to a log, and other basic agent information. Tables 234 comprise information appearing in database tables associated with the agent. Inputs 236 and outputs 238 are the input or output mnemonics that are being tracked or reported on by the agent. For several embodiments, in order for data to be tracked or reported on, each output must have an associated output. This includes, but is not limited to, log and curve information.

Figure 7:
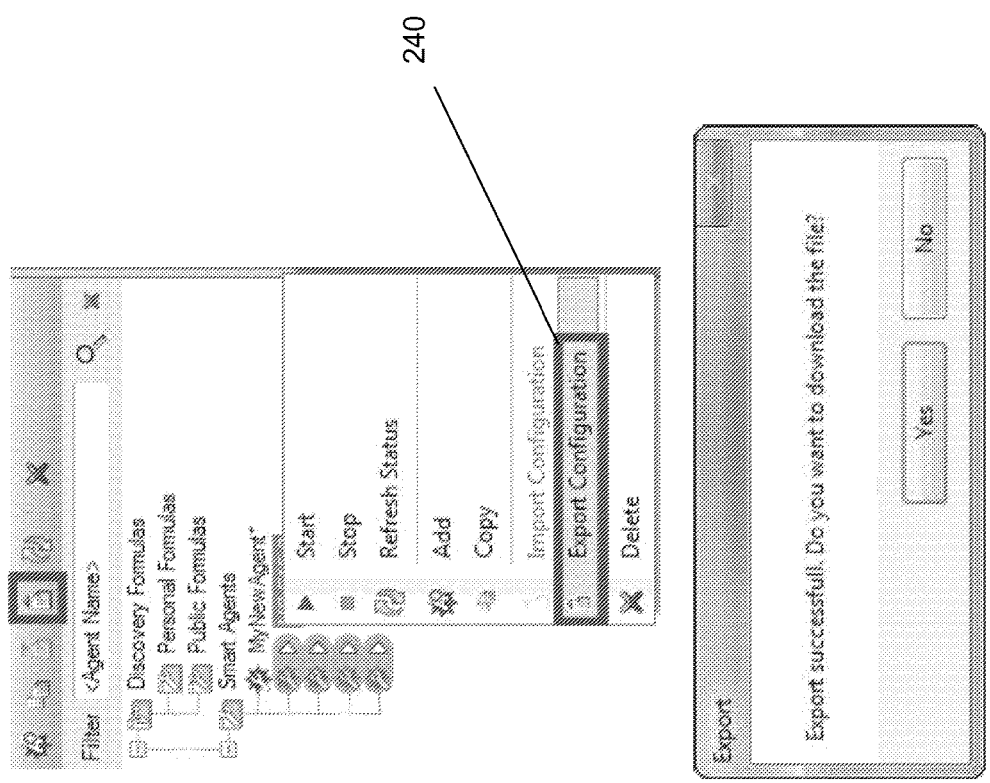
FIG. 7 shows a smart agent configuration file export menu.
Figure 8:
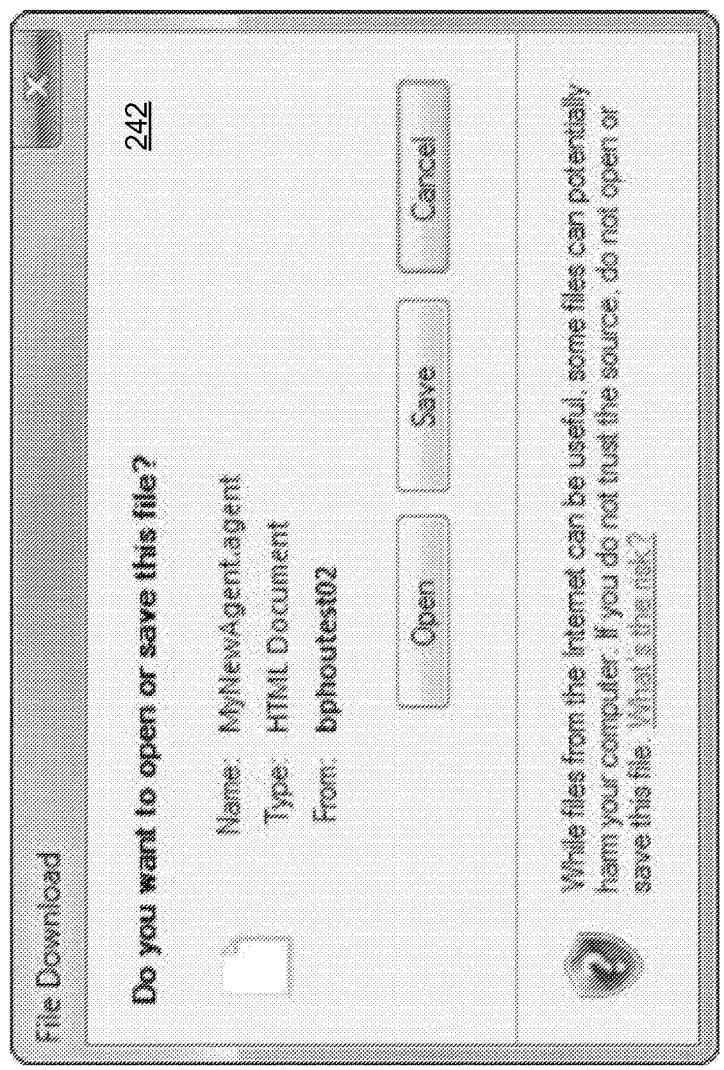
FIG. 8 shows a smart agent configuration file download display screen.

Users can export an agent configuration file for other users to import and use. The export configuration button in the toolbar can be used for a selected agent, or the agent can be right-clicked on and the export configuration option 240 chosen, as shown in FIG. 7. The user confirms 242 the action to download the file to a local hard drive or other file storage location, as seen in FIG. 8. The user may name the file as desired. Once downloaded, the file can be copied, emailed, or otherwise transferred to another user for importation and use.

Figure 9:
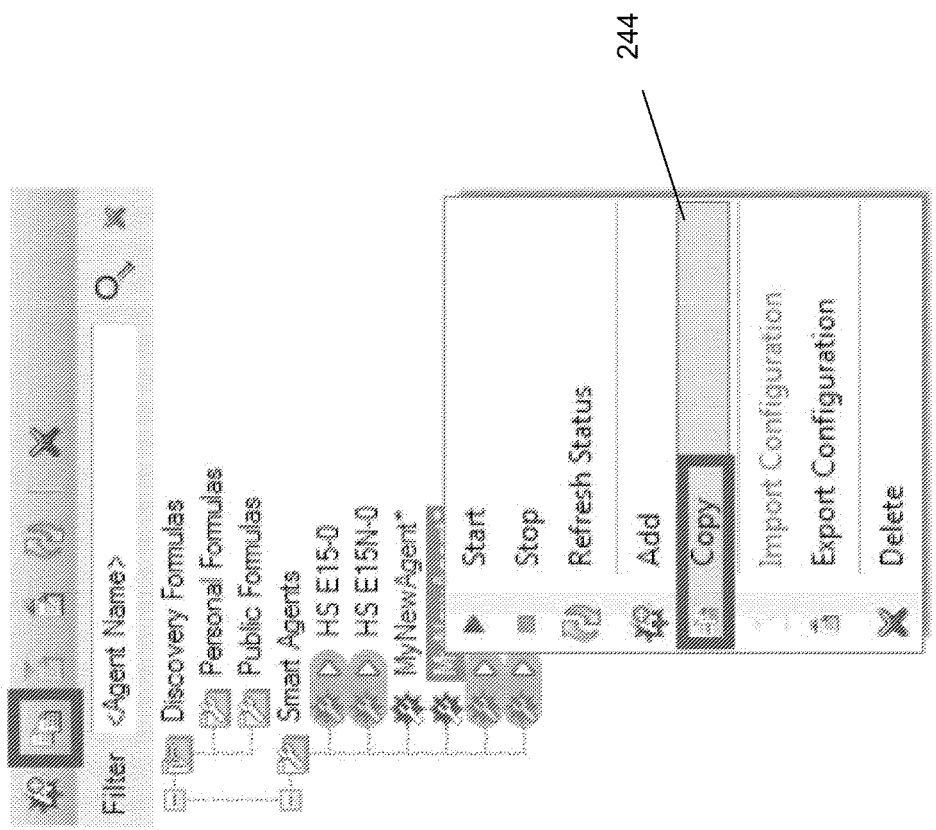
FIG. 9 shows a smart agent configuration file copy menu.

Copying an agent configuration 244, as seen in FIG. 9, allows the user to copy an agent configuration file and rename it. This saves the user from having to perform an initial setup of the agent properties or create a new configuration file multiple times, if the user has agent configurations that are similar. In one embodiment, the user right clicks on the desired agent, selects the copy option, and identifies the wellbore for which the configuration is to be used. The user can name or rename the new agent configuration.

The Well Advisor system and related consoles are described more fully in "System and Console for Monitoring and Managing Well Site Operations," U.S. patent application Ser. No. 14/196,307, which is incorporated herein in its entirety by specific reference for all purposes.

Tripping (Completions) Console

The Tripping Console is related to the Casing Running Console, and uses and extends the Hookload Signature Widgets and Drag Chart Widgets, as well as other smart agents and widgets used therewith. The Casing Running Console is described more fully in "System and Console for Monitoring and Managing Casing Running Operations at a Well Site," U.S. patent application Ser. No. 14/208,796, which is incorporated herein in its entirety by specific reference for all purposes.

Figure 10:
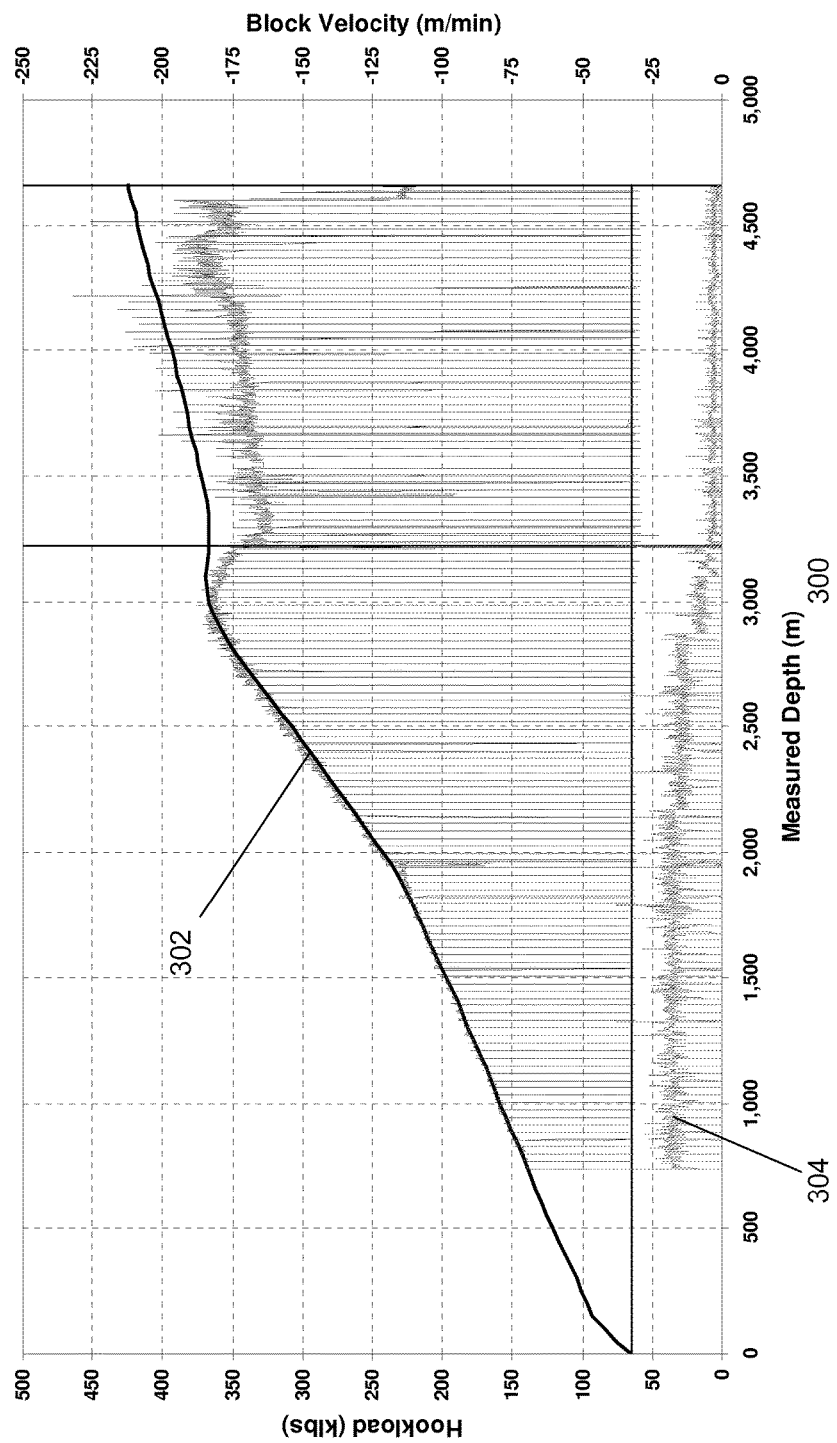
FIG. 10 shows an example of a hookload and block velocity chart.
Figure 11:
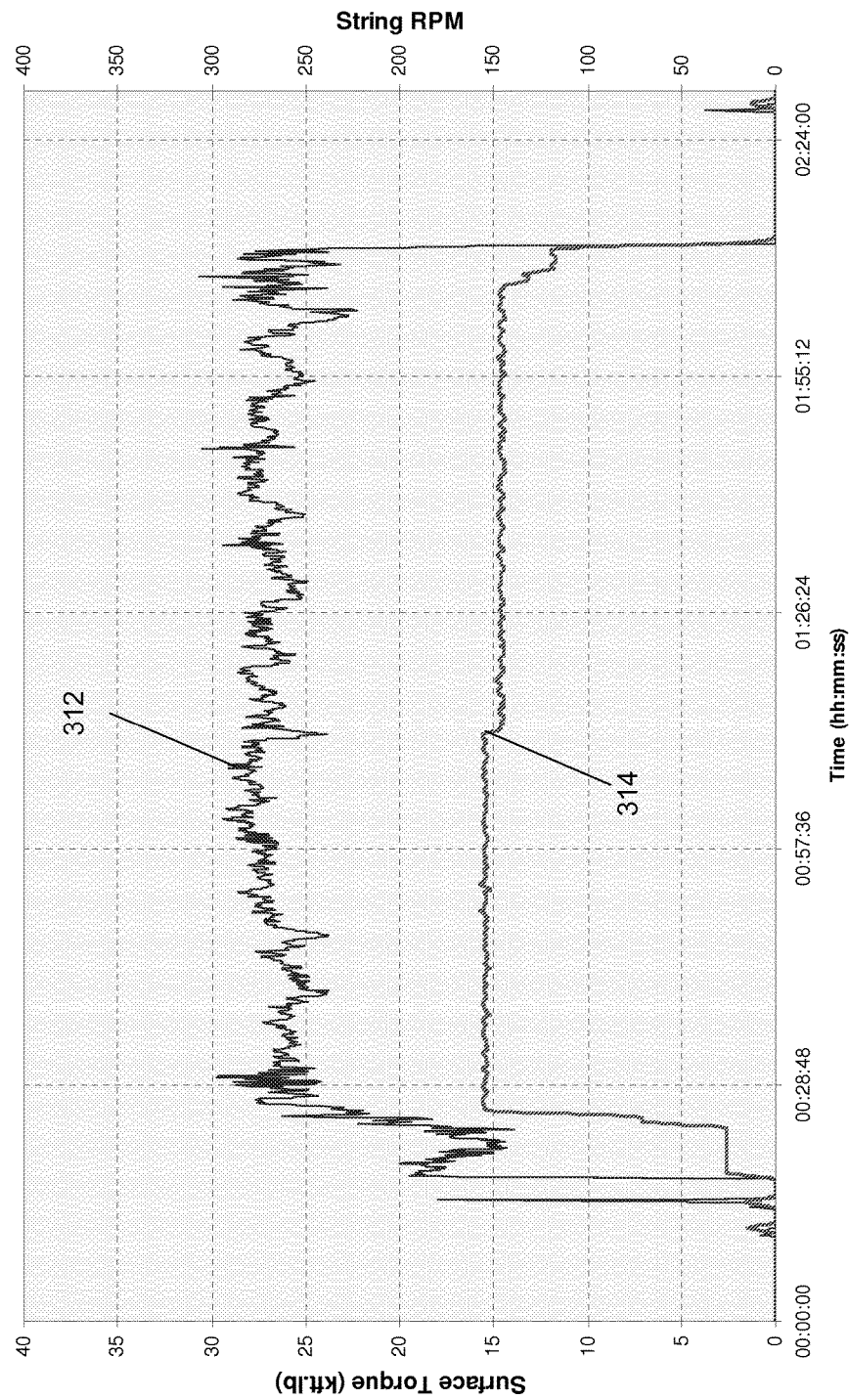
FIG. 11 shows an example of a torque and drill string RPM chart.
Figure 12:
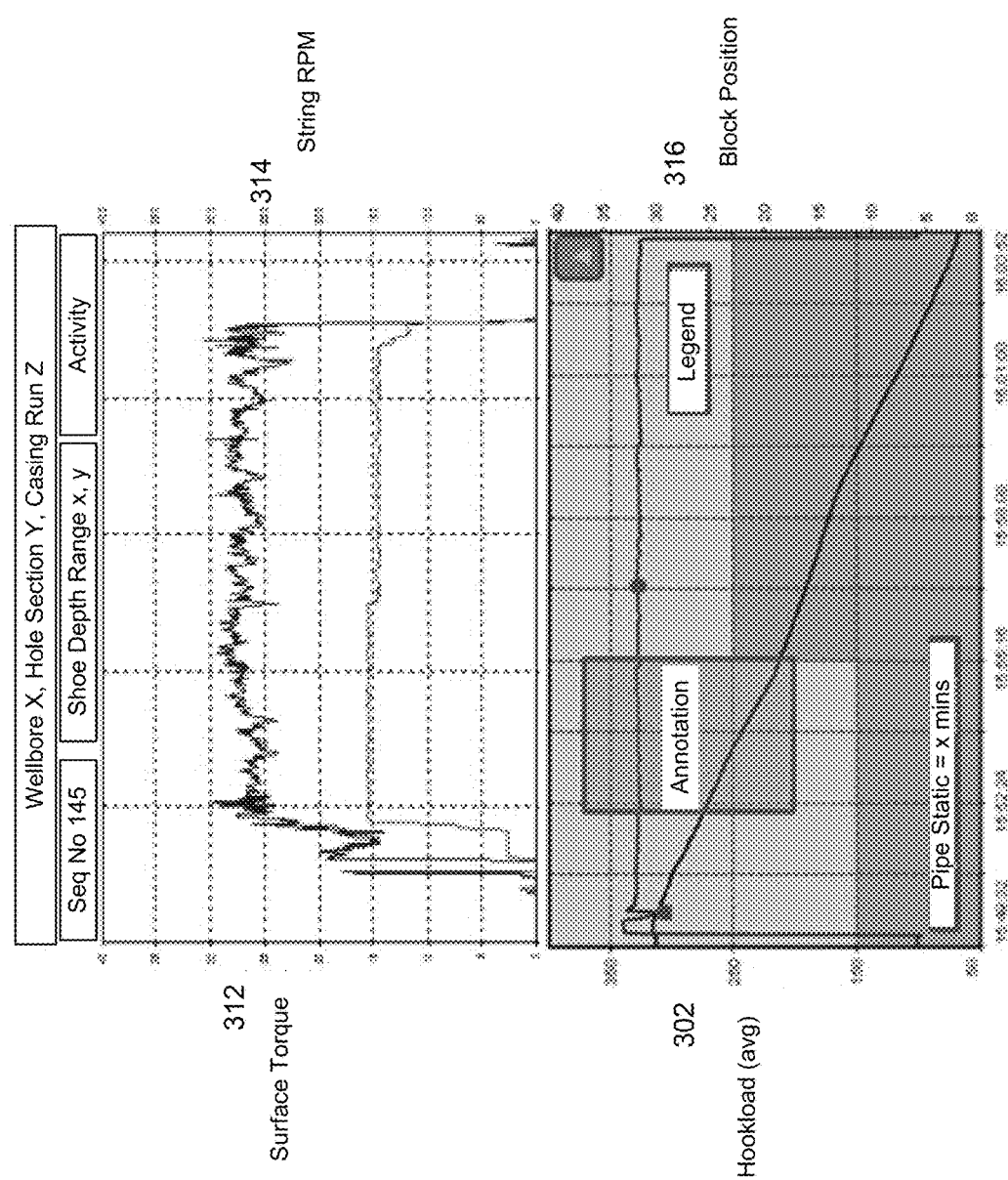
FIG. 12 shows a Joint Signature Widget display.

The Tripping Console is used to plan and monitor all tripping-in and tripping-out operations for casing, drill and completion strings, including BHA assemblies, both with no rotary movement, and with rotary movement (e.g., as with reaming-down and backreaming operations). It captures and displays, in real time or near real-time (e.g., within 10 to 20 seconds), at least the following information for all tripping states: hookload; block position; block velocity; flow rate; and surface pressure. FIG. 10 shows an example of a visual chart provided for the Tripping Console, showing hookload 302 (in k lbs) and block velocity 304 (in meters per minute) for measured depth 300 (in meters). Where there is rotary movement, the Tripping Console also captures and displays surface torque 312 and drill string RPM 314 as a function of time, as seen in FIG. 11. These may be combined through a Joint Signature Widget, with a display as seen in FIG. 12, which also shows block position 316 as a function of time.

The Make-Up Torque Widget monitors the make-up torque signatures as each joint of a completions string is made up prior to running into the wellbore. The torque response measured during the winding of a completion joint provides real time or near real time information about the make-up to help determine if the joint was made up within acceptable tolerances.

Figure 13:
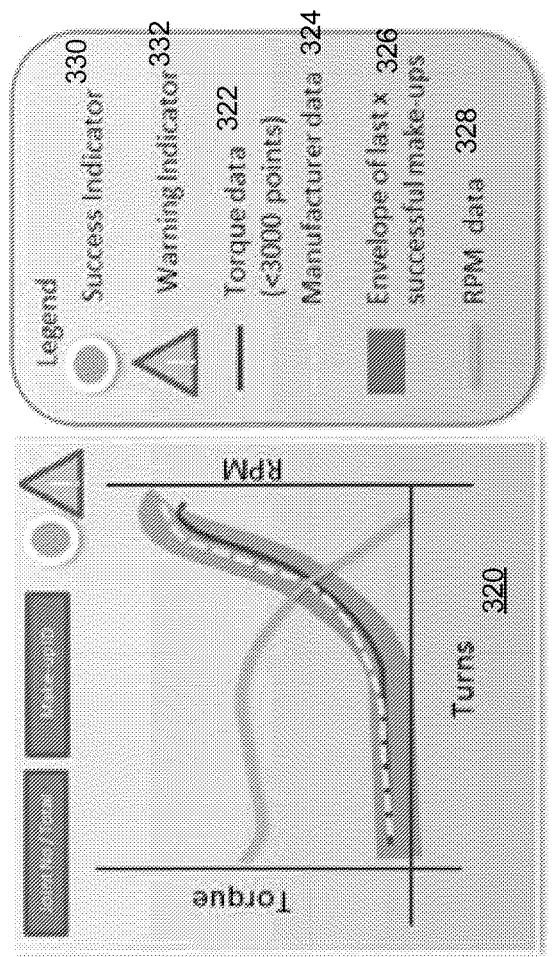
FIG. 13 shows a Joint Torque Signature display.

An example of a display 320 showing the torque signature for a joint is shown in FIG. 13. It shows the measured torque data 322 as compared to manufacturer data 324 and an envelope 326 of a certain number of most recent successful make-ups. A warning indicator 332 and success indicator 330 can be provided. In one embodiment, the success indicator is the assessment made by a service company or vendor, while the warning indicator is displayed if the analysis of the data raises concerns about the torque signature for that joint (e.g., the make-up torque exceeds a running average value by a pre-set percentage). RPM data 328 also may be presented.

Figure 14:
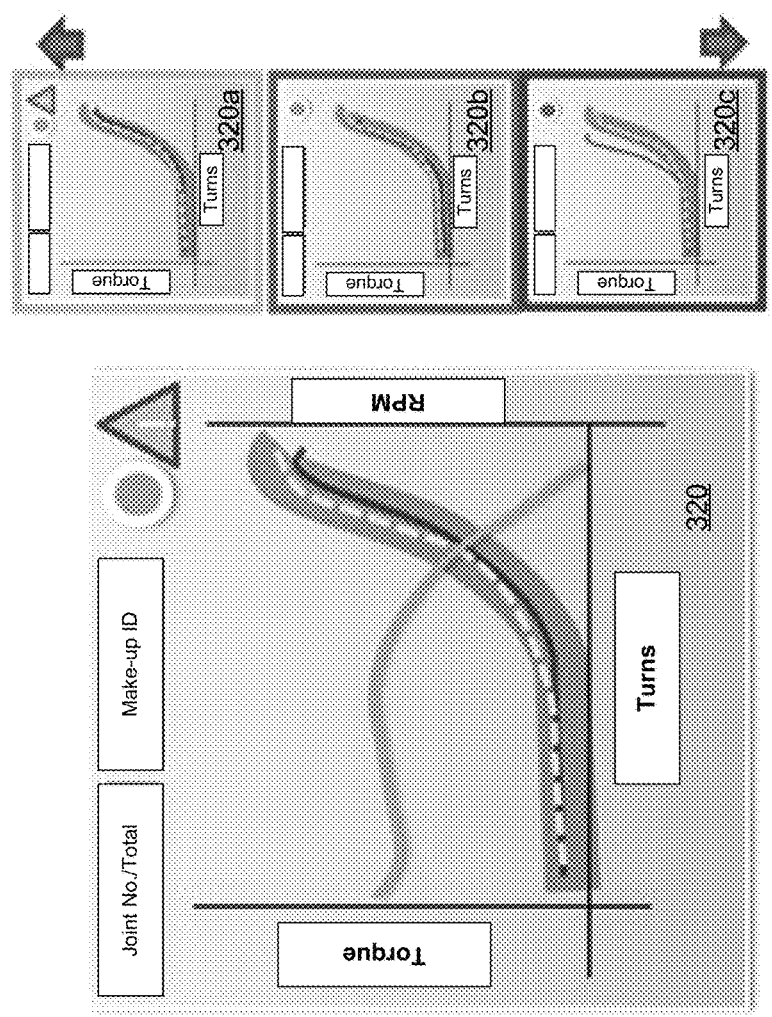
FIG. 14 shows a Make-Up Torque Widget display with thumbnails.
Figure 15:
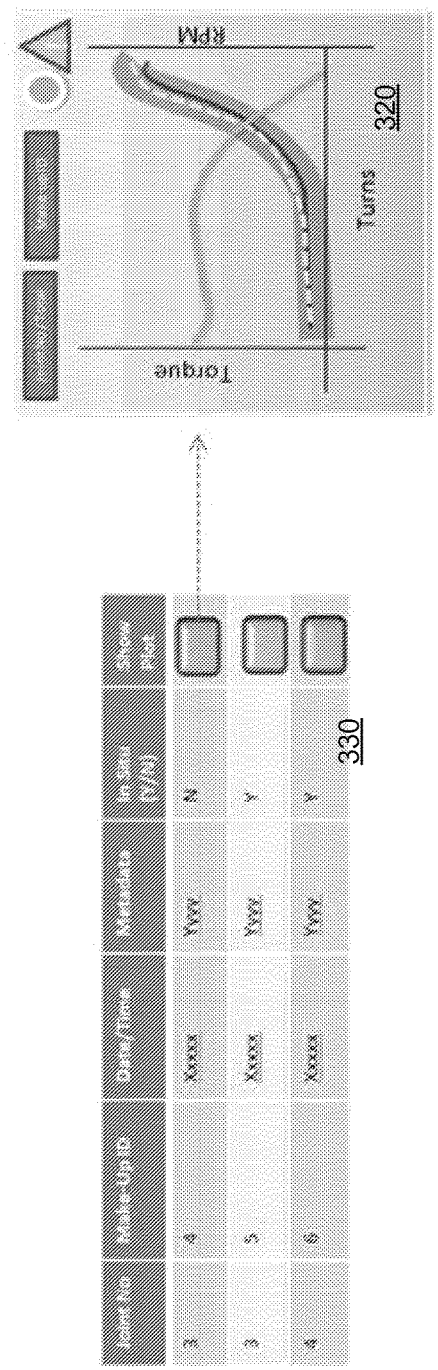
FIG. 15 shows a Make-Up Torque Widget tabular display.

FIG. 14 shows another example of a display 320 from the Make-Up Torque Widget, which provides a number of thumbnail views 320a, b, c of adjacent joints. The number of thumbnails may be configured by the user. In addition to warning indicators, the border of each thumbnail may be colored to reflect an alert status (e.g., green/amber/red). The user may browse the thumbnails to review successive joints and thus, historical make-ups. A tabular view 330 may also be provided, as seen in FIG. 15.

Figure 16:
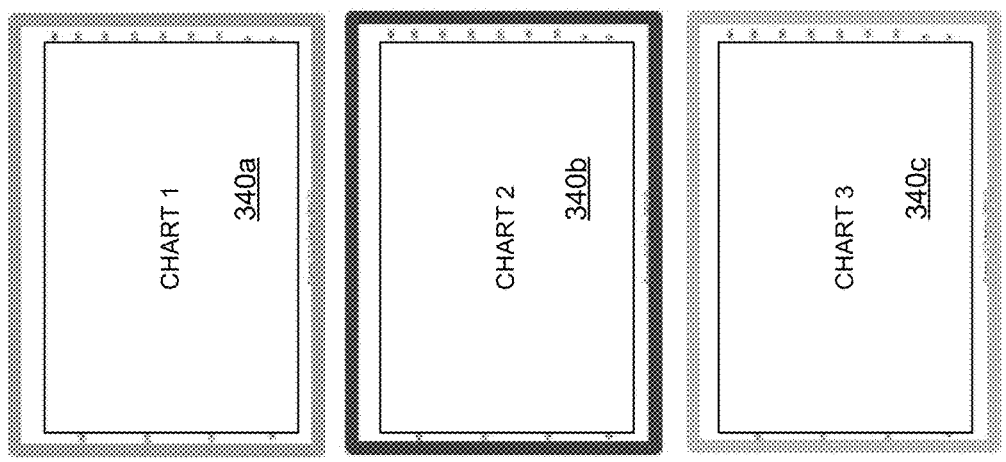
FIG. 16 shows a Hookload Signature Chart display with thumbnails.

The thumbnail strip (with or without colored borders) may also be used to display Hookload Signature charts 340a, b, c, as seen in FIG. 16.

Figure 17:
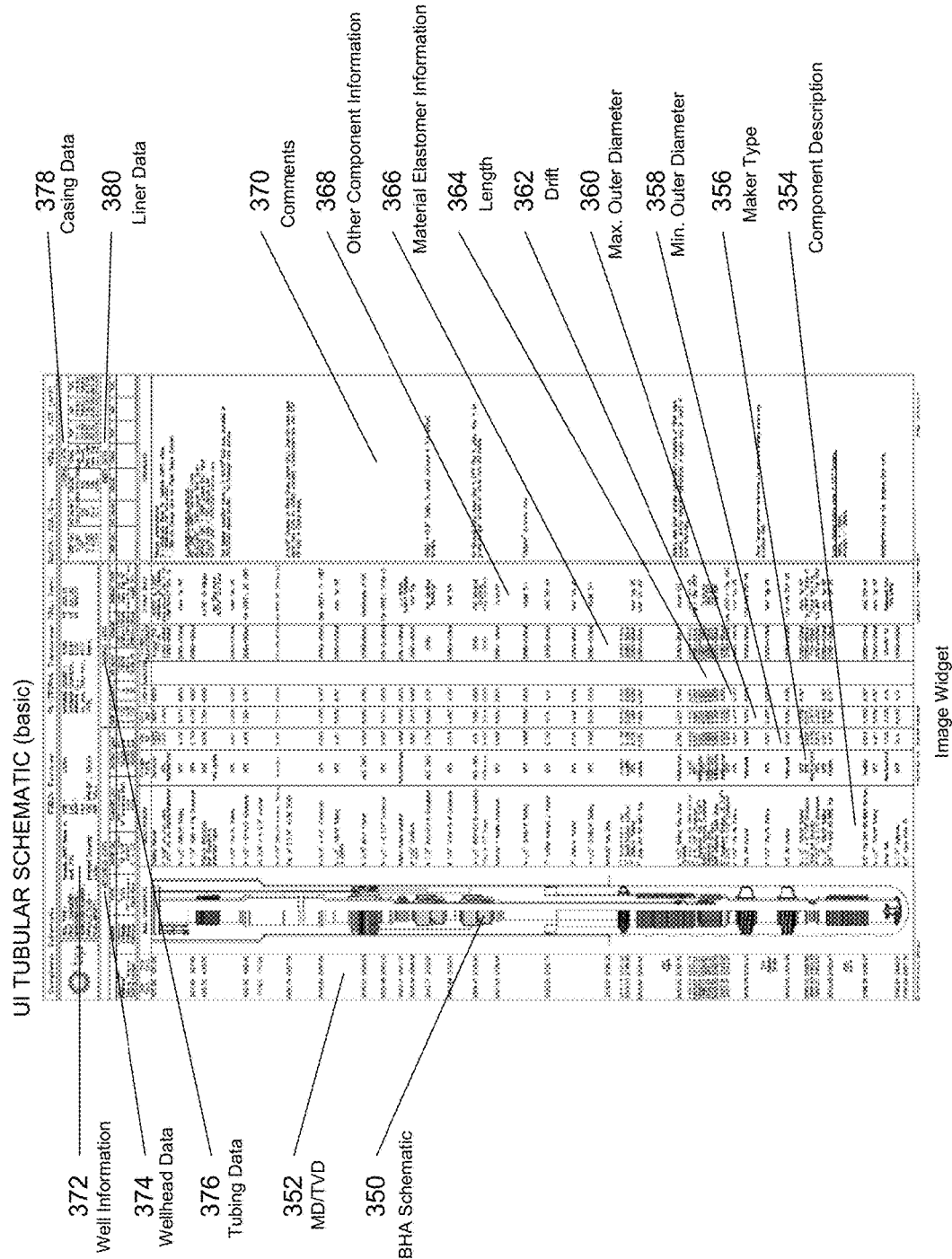
FIGS. 17-19 shows examples of Completions Schematic Widget displays.
Figure 18:
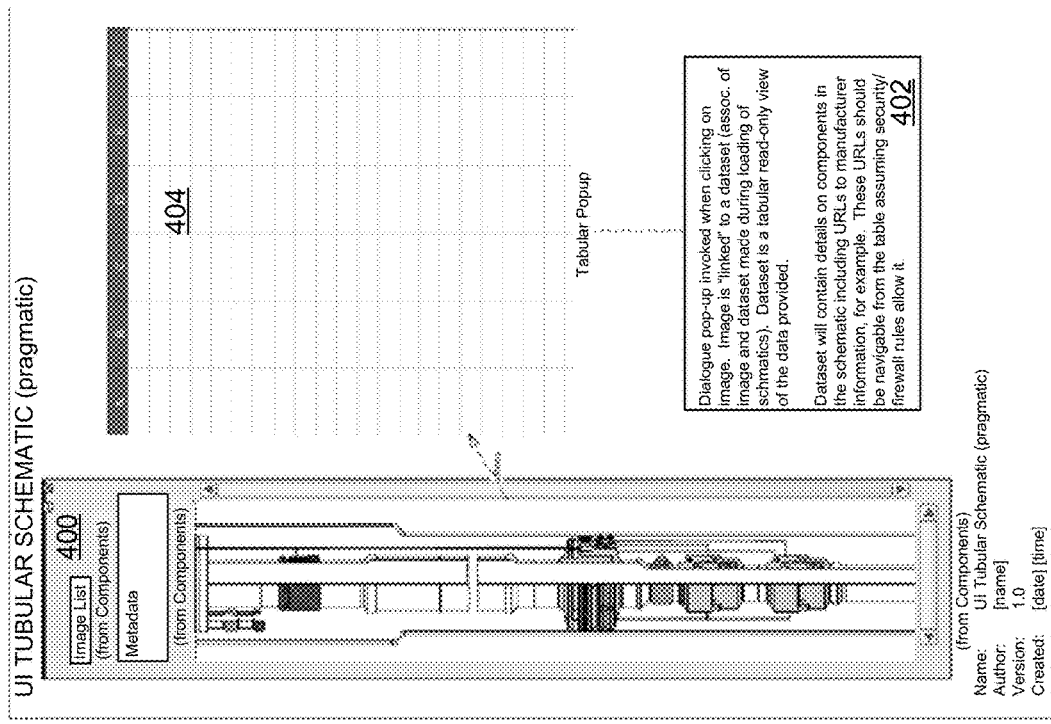
Figure 19:
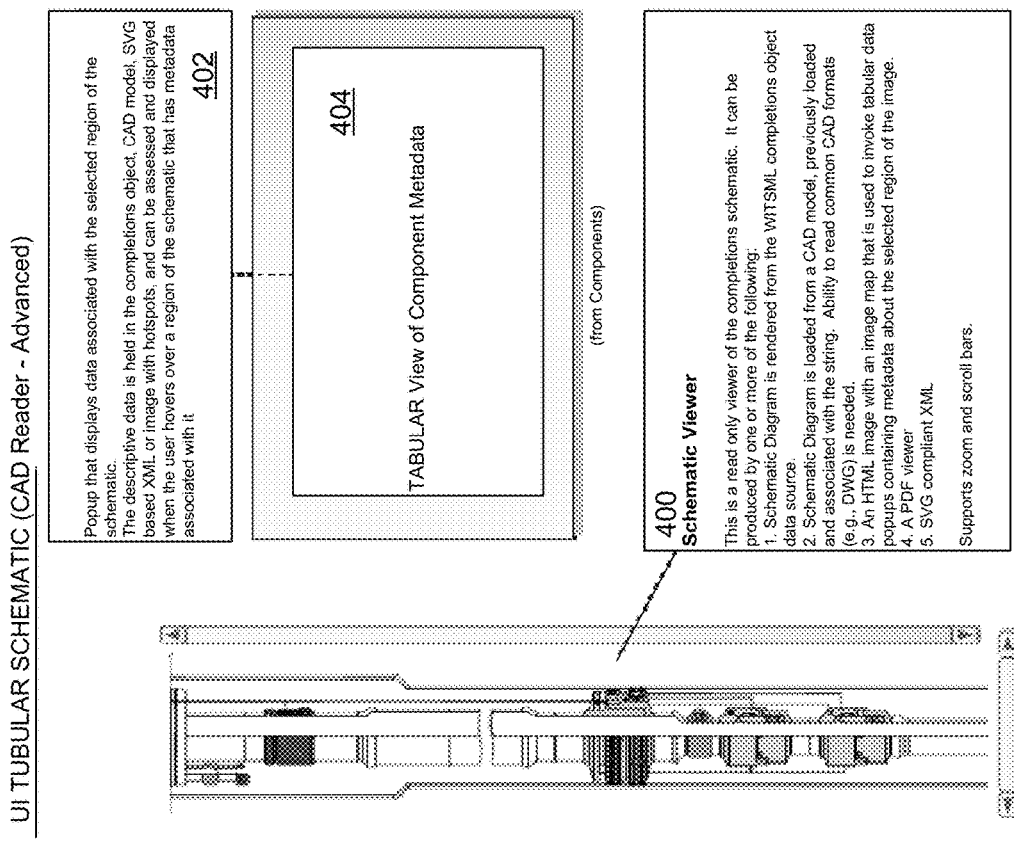

In the case of completions strings, the console uses a Completions Schematic Widget that provides additional information beyond that provided by the 2D-Wellbore Schematic Widget. Examples of displays produced by the Completions Schematic Widget are shown in FIGS. 17-19. Displays include a 2-D schematic of the BHA 350.

FIG. 17 shows a well tubular completion schematic as a visual schematic, with corresponding columns for MD and TVD 352 (in meters), description of the components 354, maker type 356, minimum inner diameter 358, maximum outer diameter 360, drift 362, length 364, material elastomer information 366, other component information 368, and comments 370. The schematic also include well information 372, wellhead data 374, tubing data 376, casing data 378, and liner data 380.

FIGS. 18 and 19 shows examples of a detailed display of a selected section 400 of the tubular schematic. The diagram in the schematic viewer may be produced from WITSML completions object data source, a CAD model, a PDF file, an HTML image with an image map that is used to invoke tabular data popups containing metadata about the selected region of the image, or an SWB compliant XML file. The user may zoom into parts of the diagram, or use scroll bars to pan or move the image in various directions. Particular components in the image may be selected or hovered over, causing a popup window 402 to appear containing data about the selected region of the image. A tabular view 404 of the components and related data may also be displayed. The display may be context sensitive. In some embodiment, the user may edit or populate object data for components in the schematic.

Figure 20:
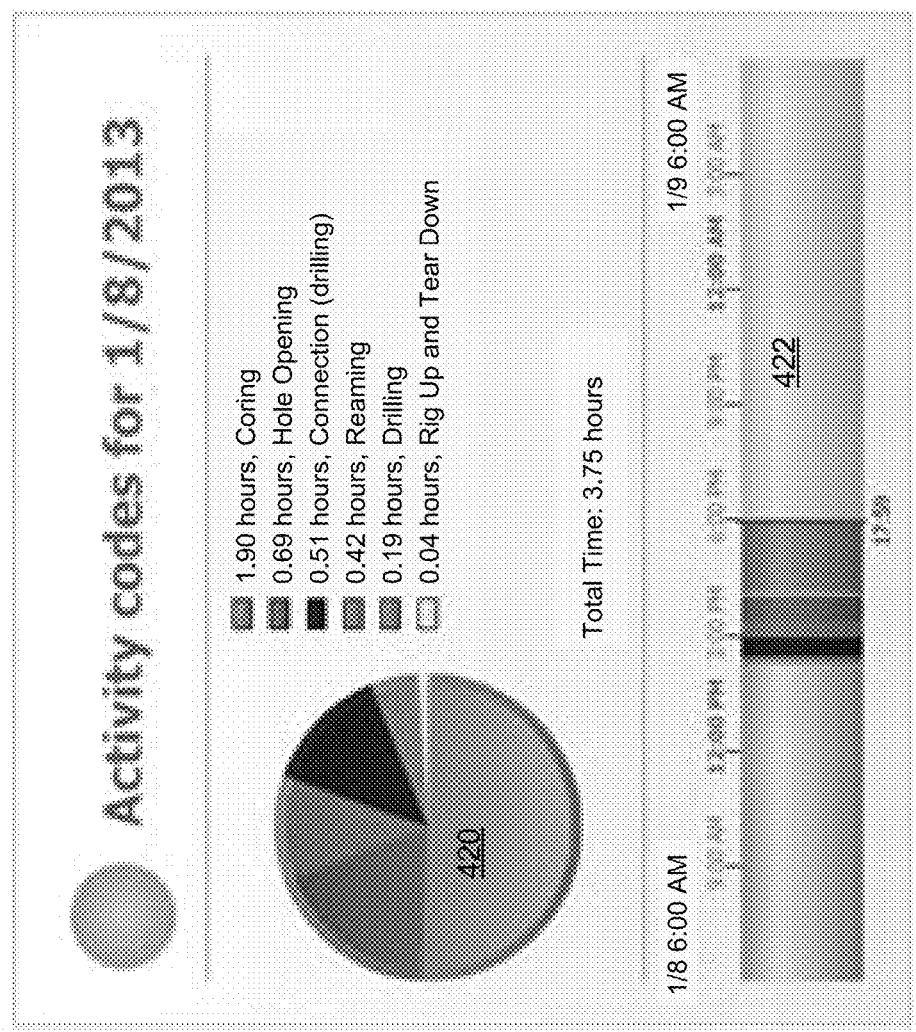
FIG. 20 shows an Activity Widget display.

The Activity Widget displays the accumulative and individual activities that occur for a particular sequence, as seen in FIG. 20. For example, the pie chart 420 shows the accumulative total time breakdown for specified activities (e.g., coring, hole opening, connection, reaming, drilling, rig up and tear down). The linear display 422 shows each individual activity occurrence on a time-based axis for each activity bound by the active or selected sequence.

The Drag Chart Widget monitors tubular trips over the lifetime of a run for a given hole section (e.g., multiple trips of a given drill string or particular tubular object, such as a particular BHA), as seen in FIG. 21. Actual and modelled hookloads 440 are shown against measured depth (MD) 442, for a series of trips into the well. Associated rotating data parameters (e.g., RPM 452, surface torque 454) may be displayed on a separate chart, as seen in FIG. 22.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for improving computer-based processing and monitoring of tubular tripping operations at a well site, comprising:
   a plurality of sensors to sample or detect parameters related to tubular tripping operations at a well site, said plurality of sensors comprising surface sensors or downhole sensors or a combination thereof;
   one or more computing devices adapted to receive parameter information in real time from said plurality of sensors during a tubular tripping operation, said one or more computing devices each further comprising a processor or microprocessor, said processor or microprocessor adapted to process the received parameter information to calculate derived parameters related to the tubular tripping operation, said received parameter information and derived parameters including hookload, block position, block velocity, flow rate, and surface pressure;
   at least one computer-readable storage medium for storing some or all of said received parameter information and said derived parameters; and
   a visual display, coupled to said one or more computing devices, for displaying in real time some or all of the received parameter information and said derived parameters.

2. The system of claim 1, said one or more computing devices further comprising at least one software smart agent having one or more formulations applicable to said drilling operations.

3. The system of claim 1, wherein the visual display shows one or more make-up torque signatures of a joint of a tubular completions string.

4. The system of claim 3, wherein the visual display shows a plurality of views of make-up torque for adjacent joints in the tubular completions string.

5. The system of claim 1, said one or more computing devices further comprising one or more software widgets.

6. The system of claim 5, wherein said one or more software widgets comprise a make-up torque widget adapted to determine and display make-up torque for a joint.

7. The system of claim 5, wherein said one or more software widgets comprise a completions schematic widget adapted to create and display a visual schematic of a tubular completions string.

8. The system of claim 5, wherein said one or more software widgets comprise a activity widget adapted to create and display a chart of time spent on individual activities for a tripping operations sequence.

9. The system of claim 5, wherein said one or more software widgets comprise a drag chart widget adapted to create and display a drag chart of multiple tripping operation sequences for a section of the well.

10. A method for improving computer-based processing and monitoring of tubular tripping operations at a well site, comprising the steps of:
    receiving, using a processor or microprocessor, tubular tripping operations parameter information from a plurality of sensors, said plurality of sensors comprising surface sensors or downhole sensors or a combination thereof;
    calculating in real time, using said processor or microprocessor, one or more derived parameters from the received pressure testing parameter information, said received parameter information and derived parameters including hookload, block position, block velocity, flow rate, and surface pressure; and displaying in real time, on a visual display, some or all of the received parameter information and the one or more derived parameters.

11. The method of claim 10, wherein the step of displaying comprises displaying one or more make-up torque signatures of a joint of a tubular completions string.

12. The method of claim 10, wherein the step of displaying comprises displaying a plurality of views of make-up torque for adjacent joints in the tubular completions string.

13. The method of claim 10, wherein the step of displaying comprises displaying a visual schematic of a tubular completions string.

14. The method of claim 10, wherein the step of displaying comprises displaying a chart of time spent on individual activities for a tripping operations sequence.

15. The method of claim 10, wherein the step of displaying comprises displaying a drag chart of multiple tripping operation sequences for a section of the well.

* * * * *